(12) United States Patent
Skog et al.

(10) Patent No.: US 7,746,819 B2
(45) Date of Patent: Jun. 29, 2010

(54) BINDING MECHANISM FOR QUALITY OF SERVICE MANAGEMENT IN A COMMUNICATION NETWORK

(75) Inventors: Robert Skog, Hässelby (SE); Justus Petersson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 529 days.

(21) Appl. No.: 11/156,488

(22) Filed: Jun. 21, 2005

(65) Prior Publication Data

US 2006/0002333 A1    Jan. 5, 2006

(30) Foreign Application Priority Data

Jul. 5, 2004    (WO) ................ PCT/SE2004/001087

(51) Int. Cl.
*H04W 4/00* (2009.01)
(52) U.S. Cl. ........................................ 370/328; 370/338
(58) Field of Classification Search ................ 370/338, 370/230.1, 328; 455/456.1, 414.1
See application file for complete search history.

(56) References Cited

U.S. PATENT DOCUMENTS

| | | | |
|---|---|---|---|
| 6,728,208 B1 * | 4/2004 | Puuskari ................ | 370/230.1 |
| 2002/0093936 A1 | 7/2002 | Chua | |
| 2002/0093979 A1 * | 7/2002 | Chen et al. ................ | 370/466 |
| 2003/0087649 A1 * | 5/2003 | Bhatia et al. ................ | 455/456 |
| 2003/0108015 A1 * | 6/2003 | Li ................ | 370/338 |
| 2003/0186692 A1 | 10/2003 | Tamura | |
| 2004/0064555 A1 | 4/2004 | Cuny et al. | |
| 2004/0105415 A1 * | 6/2004 | Fujiwara et al. ............ | 370/338 |
| 2005/0249238 A1 | 11/2005 | Haumont | |
| 2006/0143159 A1 | 6/2006 | Chowdhury et al. | |

| | | | |
|---|---|---|---|
| 2007/0230342 A1 | 10/2007 | Skog | |

FOREIGN PATENT DOCUMENTS

WO    00/41426    7/2000

(Continued)

OTHER PUBLICATIONS

ETSI TS 123 07 V5.9.0 (Mar. 2004), Digital cellular telecommunications system (Phase 2+); Universal Mobile Telecommunications System (UMTS); End-to-end Quality of Service (QoS) concept and architecture (3GPP TS 23.207 version 5.9.0 Release 5).

(Continued)

*Primary Examiner*—George Eng
*Assistant Examiner*—Michael Faragalla
(74) *Attorney, Agent, or Firm*—Nixon & Vanderhye P.C.

(57) ABSTRACT

A policy controlled bearer service for delivery of a service from an application function (to a mobile terminal is set up. A terminal identity of the mobile terminal may be used to bind to applicable policy information when setting up the bearer service. This obviates the need to transmit specific binding information to the mobile terminal during application layer signaling for the purpose of policy controlled bearer service set-up. The terminal identity is registered in a register of a policy decision function along with policy identifying information. When a bearer service activation request is received from the mobile terminal the request is mapped to applicable policy information by means of the terminal identity and the matching registration in the register of the policy decision function.

23 Claims, 4 Drawing Sheets

FOREIGN PATENT DOCUMENTS

| | | |
|---|---|---|
| WO | 01/41376 | 6/2001 |
| WO | 02/41592 | 5/2002 |
| WO | 03/049348 A2 | 6/2003 |
| WO | 2004/082224 | 9/2004 |
| WO | WO 2006/004466 | 1/2006 |
| WO | WO 2006/004471 | 1/2006 |
| WO | WO 2006/004472 | 1/2006 |

OTHER PUBLICATIONS

U.S. Appl. No. 11/171,279, filed Jul. 1, 2005; Inventor: Skog et al.

International Search Report mailed Feb. 15, 2005 in corresponding PCT Application PCT/SE2004/001102.

Related U.S. Appl. No. 11/571,636, filed Jan. 4, 2007; Inventor: Skog et al.

Related U.S. Appl. No. 11/571,635, filed Jan. 4, 2007; Inventor: Skog et al.

Translation of Chinese official action, Jun. 19, 2009, in corresponding Chinese Application No. 200480043523.9.

3GPP TS 29.208 V5.8.0 (Jun. 2004), pp. 1-33.

* cited by examiner

BINDING MECHANISM FOR QUALITY OF SERVICE MANAGEMENT IN A COMMUNICATION NETWORK

CROSS-REFERENCE TO RELATED APPLICATIONS

This application is related to commonly-assigned co-pending international patent application No. PCT/SE04/001086, entitled "Devices and Methods for Push Message Initiated Service", filed on Jul. 5, 2004 corresponding to U.S. application Ser. No. 11/571,635, filed on Jan. 4, 2007; international patent application No. PCT/SE04/001103, entitled "Methods and Devices for Supplying Quality of Service Parameters in HTTP Message", filed on Jul. 5, 2004, corresponding to U.S. application Ser. No. 11/571,636, flied on Jan. 4, 2007; and international patent application No. PCT/SE04/001102, entitled "Methods and Devices for Changing Quality of Service", filed on Jul. 5, 2004, corresponding to U.S. application Ser. No. 11/171,279, filed on Jul. 1, 2005, the disclosures of which are incorporated herein by reference.

FIELD OF THE INVENTION

The present invention relates to equipment and methods in mobile communication systems, and more particularly, to mechanisms for quality of service management of transmissions relating to a packet data service.

BACKGROUND

Communication networks for packet based communication of information in the form of data bits are well known to the person skilled in the art. The growing importance of mobile communication creates the demand to transfer data over wireless connections. The 3rd Generation Partnership Project (3GPP) is a collaboration agreement that brings together a number of telecommunications standards bodies and was established to produce globally applicable Technical Specifications and Technical Reports for a 3rd Generation Mobile System based on evolved GSM core networks and the radio access technologies that they support. This includes maintenance and development of the Global System for Mobile communication (GSM) Technical Specifications and Technical Reports including evolved radio access technologies (e.g. General Packet Radio Service (GPRS) and Enhanced Data rates for GSM Evolution (EDGE)).

One of the issues that the 3GPP is currently working on is a framework for providing end-to-end Quality of Service for services involving GPRS networks as described in the technical specification 3GPP TS 23.207 V6.2.0 (2004-03). This technical specification describes the use of a Policy Control mechanism in order to control and authorize the use of network resources prior to set-up of a service.

In the future it is assumed that packet switched services undergo Policy Control by means of a Policy Decision Function (PDF). The PDF is a logical element that is used as a logical policy decision element and enables coordination between events in the application layer and resource management in the IP bearer layer.

Policy Control was developed since it is considered important that network managers and service providers can to monitor, control, and enforce the use of network resources and services based on "policies" derived from certain criteria such as the identity/authority level of users and applications, traffic bandwidth requirements, security considerations, time of day/week etc. Because there are varying circumstances in which various entities are entitled to use the services they request, there is a need for rules, need for enforcement methods of these rules, and a need for a "judge" to decide when they apply. Accordingly, three major components of a policy system include policy rules, which are typically stored in a policy database, policy enforcement, which may be implemented at Policy Enforcement Points (PEP), and Policy Decision Points. The IETF has standardized a protocol for information exchange between PEPs and Policy Decision Points under the term Common Open Policy Service (COPS). In general, a policy may be regarded as a collection of rules that result in one or more actions when specific conditions exist.

FIG. 1 is a schematic block diagram that illustrates the different elements that are involved in the policy control mechanism developed by 3GPP. FIG. 1 illustrates an example where a service is set-up between a mobile User Equipment (UE) 1 and an Application Function (AF) of a service provider. The UE includes an AF Client 3 which communicates with the AF 2 by means of AF session signaling 4 in order to initiate an application session. The set-up of the session and activation of the service require set-up of a bearer service to carry the data packets of the session. The session may include one or a plurality of different IP flows with specific requirements for bearer resources. The AF session signaling 4 may include information on Quality of Service (QoS) requirements which are translated into bearer QoS parameters by a translation/mapping function 5 in the UE. In order to activate the bearer service the UE sends a request for activation of a PDP context with the bearer QoS parameters that are determined by the translation/mapping function to a GGSN 6. The communication between the UE and the GGSN is in this example handled by means of UMTS BS Managers 7, 8 in the UE and the GGSN respectively. In this example the GGSN functions as a PEP and is provided with an IP BS Manager 9 which is involved in QoS management. The GGSN 6 interacts with a PDF 10, via a Go interface 11, in order to execute policy control. The PDF 10 makes policy decisions based on policy set-up information obtained from the AF 2 via a Gq interface 12. More detailed information regarding the elements illustrated in FIG. 1 and their function can be found in the above mentioned technical specification TS 23.207 V6.2.0.

When 3GPP specified the policy control mechanism an authorization token was also introduced in order to establish a binding mechanism for mapping PDP contexts and IP flows to policy information. The authorization token is generated by the PDF for a particular AF session on request from the AF. The authorization token includes a fully qualified domain name of the PDF and is unique across all PDP contexts associated with an APN (Access Point Name). The AF sends the authorization token to the UE in the AF session signalling. The UE should then include the applicable authorization token in any request to activate or modify a PDP context. The authorization token will then be used in the GGSN and PDF to map to the correct policy information.

The plan to introduce the authorization token and the associated handling of it when implementing policy control in 3G systems has a number of disadvantages. One major disadvantage is that it requires modification of existing UEs in order to make them capable to handle authorization tokens. Another disadvantage is that the introduction of the authorization token requires new standardization for the RTSP (Real-Time Streaming Protocol), SIP (Session Initiation Protocol), and SDP (Session Description Protocol) and other protocols used in set-up and handling of application sessions.

SUMMARY OF THE INVENTION

An object is to provide devices and methods for employing a simple binding mechanism when setting up a policy controlled bearer service for delivery of a service to a mobile terminal.

A terminal identity is used as binding information in order to bind a bearer service activation request to the applicable policy information and thereby obviate the need to transmit an authorization token to the terminal during bearer service activation.

According to a first aspect, a method for setting up a policy controlled bearer service for delivery of a service from an application function to a mobile terminal is provided. The method includes the steps of registering a terminal identity of the terminal associated with policy identifying information in a register of a policy decision function; receiving a bearer service activation request from the terminal, via a core network node, which bearer service activation request includes the terminal identity, such as MSISDN, IMEI, IMSI etc. and a set of requested QoS parameters for the bearer service; binding the bearer service activation request to the policy identifying information by means of the terminal identity to determine applicable policy information for the bearer service; performing a policy check by means of checking if the requested QoS parameters fulfill said applicable policy information; and sending an accept message to the core network node to initiate completion of the bearer service set-up if the policy check was successful.

According to a second aspect, a method in a policy decision function for performing policy control on a bearer service for delivery of a service from an application function to a mobile terminal is provided. The method according to the second aspect of the invention comprises the steps of receiving a registration message, including a terminal identity and policy identifying information; registering the terminal identity associated with the policy identifying information in a register; receiving a bearer service activation request from the terminal, via a core network node, which bearer service activation request includes the terminal identity and a set of requested QoS parameters for the bearer service; binding the bearer service activation request to the policy identifying information in the policy decision function by means of the terminal identity to determine applicable policy information for the bearer service; performing a policy check by means of checking if the requested QoS parameters fulfill said applicable policy information; and sending an accept message to the core network node to initiate completion of the bearer service set-up if the policy check was successful.

According to a third aspect, a policy decision function for performing policy control on a bearer service for delivery of a service from an application function to a mobile terminal is provided. The policy decision function includes a first interface for receiving a registration message, including a terminal identity and policy identifying information; a register for registering the terminal identity associated with the policy identifying information; a second interface for receiving a bearer service activation request from the terminal, via a core network node, which bearer service activation request includes the terminal identity and a set of requested QoS parameters for the bearer service; and processing means for binding the bearer service activation request to the policy identifying information in the policy decision function by means of the terminal identity to determine applicable policy information for the bearer service, performing a policy check by means of checking if the requested QoS parameters fulfill said applicable policy information, and for sending an accept message to the core network node to initiate completion of the bearer service set-up if the policy check was successful.

One advantage is that it obviates the need to transmit an authorization token to the terminal for the purpose of setting up a policy controlled bearer service. This means that there is no impact on the terminals from a standard on the terminal.

Another advantage is that by means of the present invention, no new standardization is required for RTSP (Real-Time Streaming Protocol), SIP (Session Initiation Protocol), and SDP (Session Description Protocol) and other protocols used in set-up and handling of application sessions.

A further advantage is that the policy mechanism and QoS control mechanism of the invention are possible to implement in the mobile terminals that are available on the market today. Thus there is no need to modify the mobile terminals in order to implement the present invention.

Another advantage is that it allows for a service provider to upgrade the QoS parameters that a terminal requests for a bearer service if the requested QoS parameters do not fulfill the service providers QoS demand. This is possible since an embodiment of the present invention allows for the possibility to check if the requested QoS parameters fulfill a set of predefined minimum QoS requirements provided by the application function. If the predefined minimum QoS requirements are not fulfilled by the requested QoS parameters it is possible to determine modified QoS parameters for use when setting up the bearer service.

Further advantages and features will become apparent when reading the following detailed description in conjunction with the drawings.

DETAILED DESCRIPTION

Figure 1:
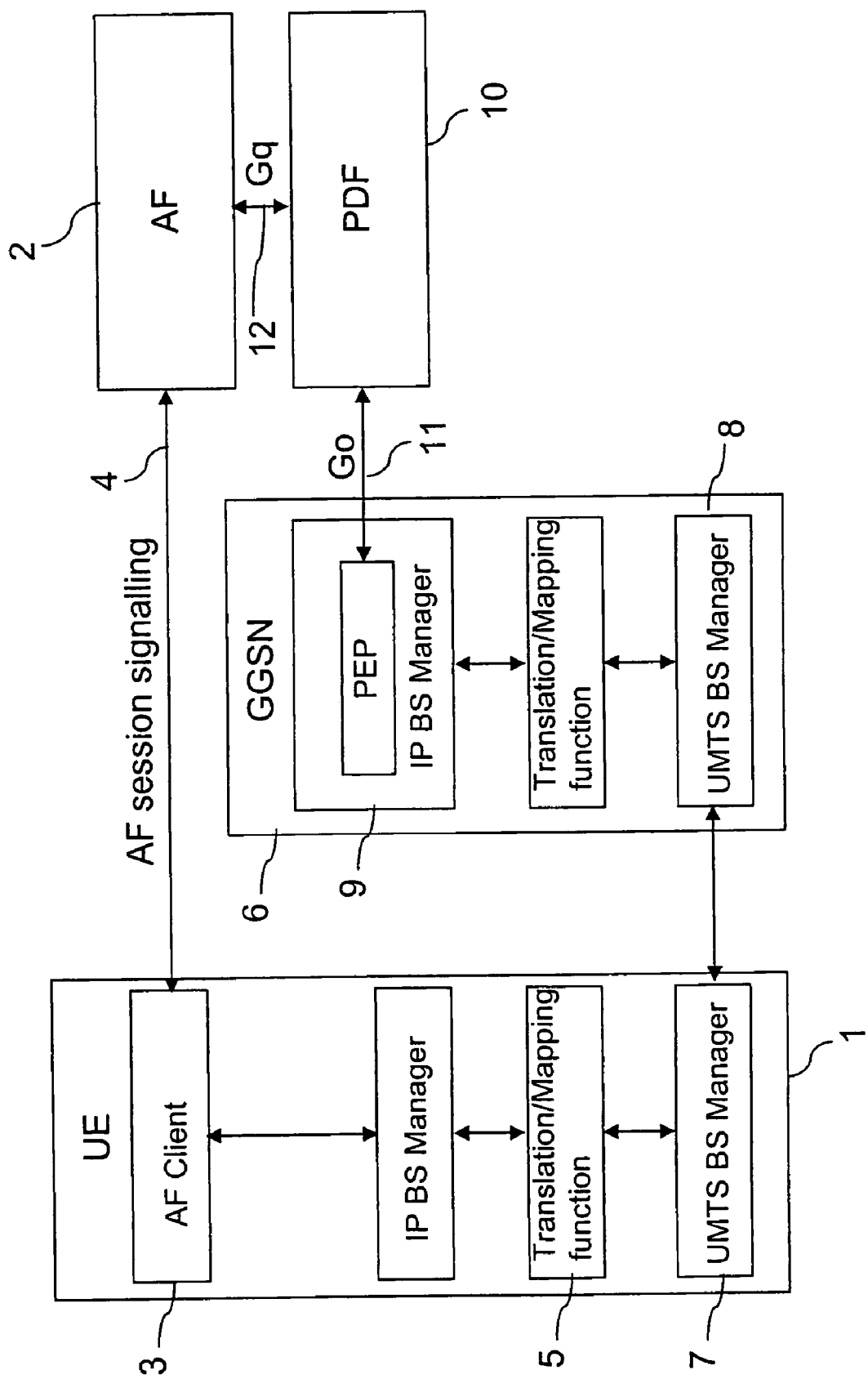
FIG. 1 is a schematic block diagram illustrating the different elements that are involved in the policy control mechanism developed by 3GPP.

Reference will be made to the accompanying drawings, in which preferred example embodiments are shown. This technology may, however, be embodied in many different forms and should not be construed as limited to the example embodiments set forth herein; rather, these example embodiments are provided so that this disclosure will be thorough and complete. In the drawings, like numbers refer to like elements.

Packet switched services in a mobile communication system include packet switched communication between a mobile client terminal of an end-user and an application server. The mobile communication system includes a radio network such as for example a WCDMA, CDMA2000, Wireless LAN or GPRS network in which the mobile client terminal resides.

Figure 2:
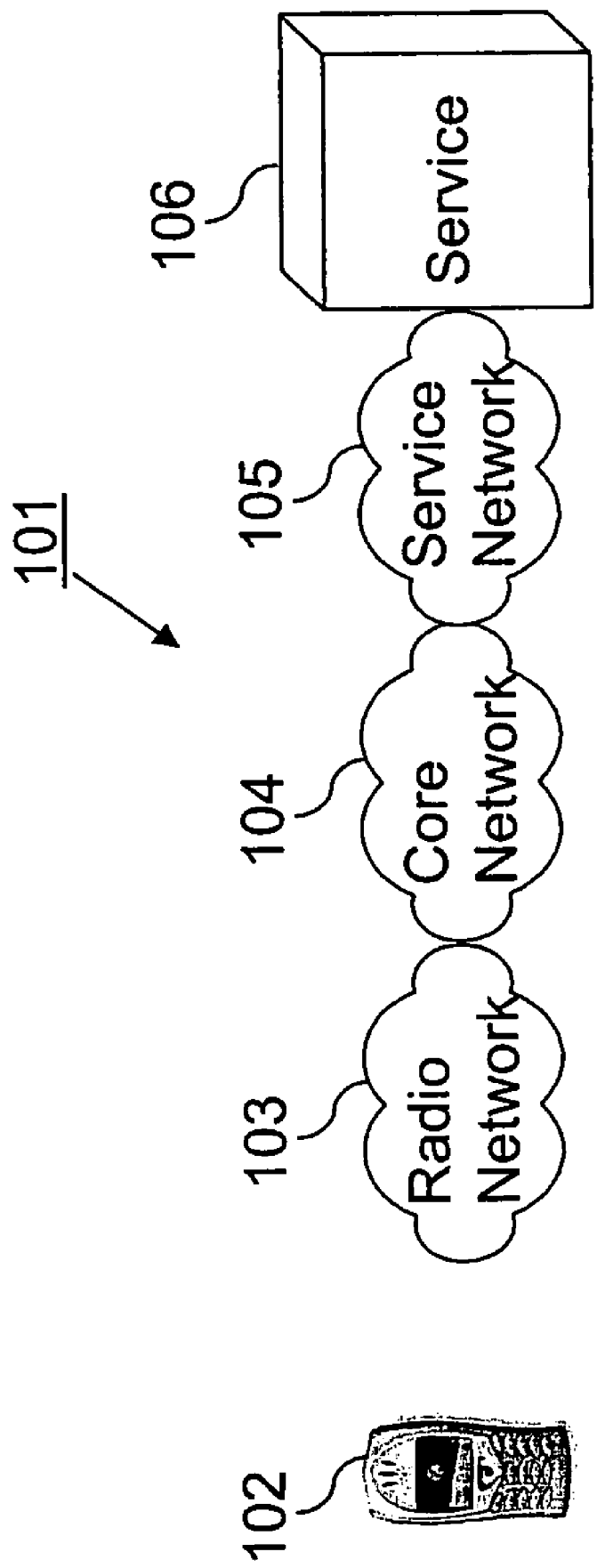
FIG. 2 is a schematic block diagram illustrating the general network architecture of a mobile communication system.

FIG. 2 is a schematic block diagram illustrating the general network architecture of a mobile communication system. The mobile system 101 in FIG. 1 comprises a mobile client terminal 102 which may communicate with a network node 106 of a service provider and thereby receive a service that is offered by the service provider. The communication between the client terminal 102 and the network node 106 is carried out via a radio network 103, a core network 104 and a service network 105. The radio network 103 may for instance be a UTRAN (UMTS Terrestrial Radio Access Network), the core network 104 may for instance be a UMTS Core Network and the service network may for instance be the Internet or a private IP network of a service provider. The network node 106 of the service provider may for instance be an application server.

Figure 3:
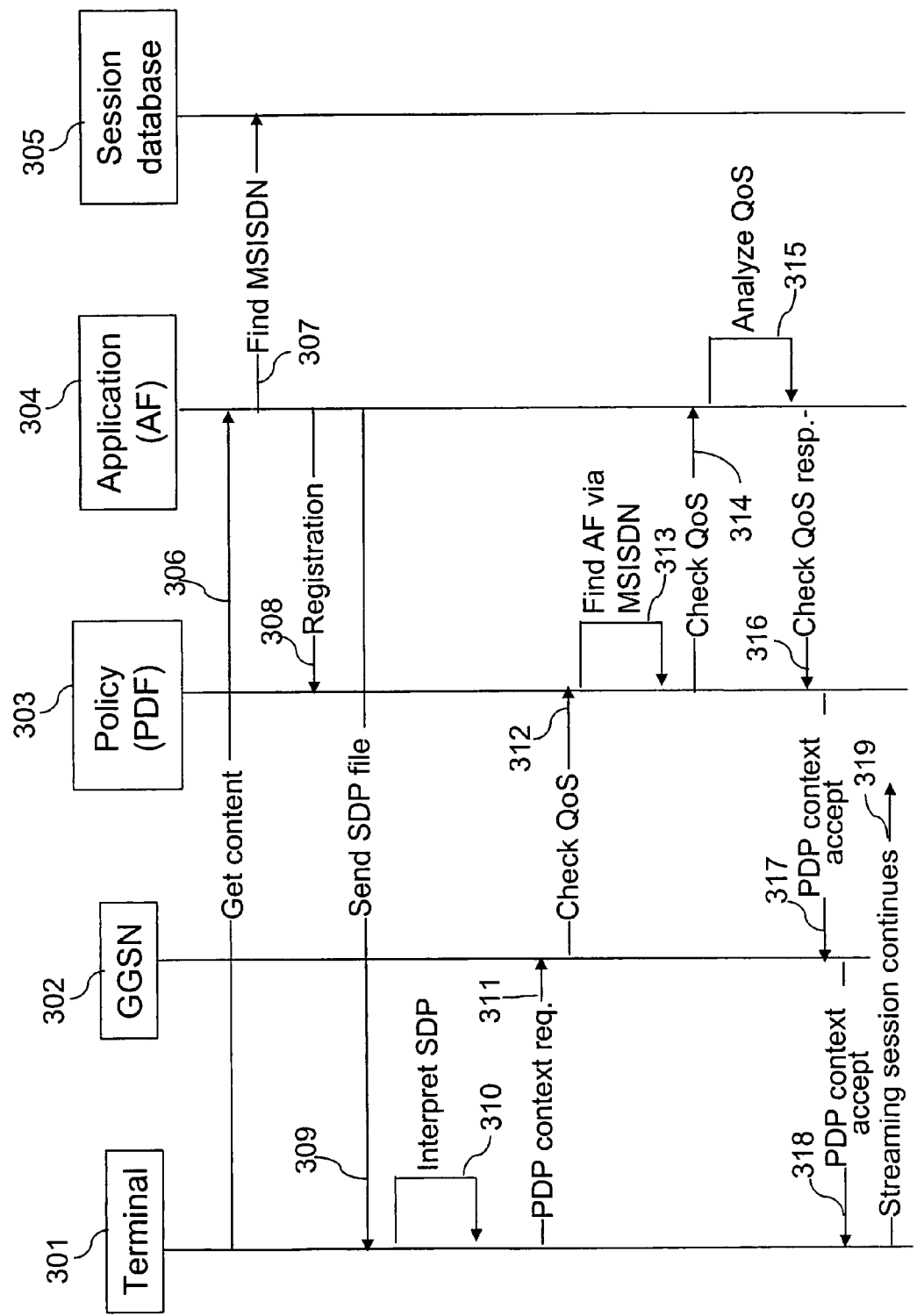
FIG. 3 is a schematic flow diagram illustrating an example embodiment of a method.

FIG. 3 is a schematic flow diagram illustrating an example embodiment. The figure illustrates the interaction between a mobile terminal 301, a GGSN (Gateway GPRS Support Node) 302, a policy decision function (PDF) 303, an application function (AF) 304 and a session database 305 when setting up a policy controlled bearer service. Further network nodes may be involved in the process of setting up the bearer service but only the nodes that are of particular relevance to the present invention are illustrated in FIG. 3 to simplify the description.

In FIG. 3 it is assumed that a primary PDP context exists and that the terminal 301 asks the AF 304 for a streaming content, step 306. The AF is in this example a streaming server. The AF could also be for instance an MMS or Download server.

After receiving the request for a streaming content the AF 304 finds a terminal identity associated with the terminal 301. In this example the terminal identity is an MSISDN (Mobile Identification Number) which is found by asking the session database 305 for a mapping between a terminal IP-address and MSISDN according to a method that is well known to the person skilled in the art, step 307. The AF then registers in the PDF 303 that it is interested in checking the QoS of the PDP context that is to be set up for delivery of the requested streaming content, step 308. The registration involves registering the MSISDN associated with policy identifying information in a register in the PDF. In this example the policy identifying information is an IP address of the AF so that the AF can be asked for applicable policy information. It is assumed that the address to the PDF is previously known to the AF. After the registration in the PDF, the AF sends an SDP-file to the terminal, step 309. The terminal then interprets the SDP-file and deduces QoS parameters to request for the bearer service to be set-up for delivery of the streaming content, step 310. The terminal then initiates a secondary PDP context by means of sending a activation request for a second PDP context, step 311. The activation request includes the QoS parameters that were deduced form the interpretation of the SDP-file. These QoS parameters will hereafter be denoted as requested QoS parameters. The steps 309, 310 and 311 are well known to the person skilled in the art and will therefore not be described in greater detail herein.

The GGSN 302 receives the PDP context activation request. The GGSN sends a request to the PDF to check the requested QoS parameters, step 312. The check request includes the MSISDN of the mobile terminal and the requested QoS parameters. It is assumed that the address of the PDF is known to the GGSN. When receiving the check request the PDF 303 finds the address of the AF 304 by mapping the MSISDN received in the check request to the register in which the AF's previous registration is stored, step 313. The PDF 303 then sends a check request to the AF 304 with the address that matches the MSISDN of the terminal in the register, step 314. The check request includes the MSISDN of the terminal and the requested QoS parameters.

The AF 304 processes the QoS parameters and performs a policy check of the QoS parameters, step 315. The policy check may include checking that the QoS requirements does not succeed the limits of a subscription of the user of the mobile terminal according to the principles described for the policy mechanism specified by 3GPP.

According to an example embodiment, the policy check may also include a supplemental check that includes checking that the requested QoS parameters fulfil a set of predefined minimum QoS parameters which define the QoS that the service provide considers desired or needed for the bearer service. This supplemental check allows for the application function to initiate an upgrade of the QoS requirements if the requested QoS parameters do not achieve the QoS that the service provider considers desired or needed. The supplemental check and the mechanism for upgrading the requested QoS parameters will be described in further detail below.

After the AF 304 has checked the requested QoS parameters the AF sends an accept message or a modify message back to the PDF, step 316. If the policy check showed that the requested QoS parameters fulfilled the applicable policy, and selectively also the predefined minimum QoS parameters an accept message is sent. A modify message may be sent if the requested QoS parameters exceed the applicable policy and will in that case include an order to downgrade the requested QoS parameters. The order to downgrade the requested QoS parameters may be in the form of a set of downgraded QoS parameters to be used when setting up the bearer service. If the policy check includes checking that the requested QoS parameters match the predefined minimum QoS parameters a modify message may be sent if the requested QoS parameters are considered to result in a QoS that is poorer than what the service provider has defined as desired or needed. In that case the modify message may include an order to upgrade the requested QoS parameters. The order to upgrade the requested QoS parameters may be in the form of a set of upgraded QoS parameters to be used when setting up the bearer service.

After receiving the accept or modify message from the AF 304 the PDF 303 answers back to the GGSN. In this example the PDF sends a message accepting the secondary PDP context to the GGSN, step 317. If the policy check resulted in a decision to modify the requested QoS parameters the message from the PDF 303 to the GGSN 302 may include modified QoS parameters to be used when setting up the secondary PDP context.

The set-up of the secondary PDP context is then completed by means of the PDP context set-up messages that are well known to a person skilled in the art. This includes that the GGSN answers back to the terminal via radio and core network nodes (not shown), step 318. When the PDP context is set-up the streaming session continues, step 319 and the streaming content may be delivered to the terminal over the secondary PDP context.

In FIG. 3 it was illustrated that the policy check included that the PDF 303 asked the AF 304 to check the requested QoS parameters. It is however possible that this check is performed by the PDF. The AF may for instance send the applicable policy information and selectively also the set of predefined minimum QoS parameters to the PDF when it received the check request from the PDF. It is also possible that the applicable policy information was transferred to the PDF during the step 308 of registering the terminal identity in the PDF. The applicable policy information could then be stored in the register in the PDF along with the terminal identity.

In the above description, it was mentioned that it was assumed that the AF and the GGSN was aware of the address of the PDF. This may for instance be the case if the network architecture was configured such that there is a preconfigured relationship between a single PDF and a number of GGSNs and a number of AFs. Each GGSN and each AF should in that case however be configured to only communicate with the single PDF for the purpose of achieving policy control.

With the binding mechanism which uses a terminal identity as binding information, the mobile terminal requests activation of a single bearer service, such as a PDP context, at a time. The registration of the terminal identity in the PDF should preferably be removed after the policy check is completed so that the terminal may request set-up of another bearer service and have a new request mapped correctly to applicable policy information.

The supplemental check described above to determine if the requested QoS requirements match the QoS that the service provider considers desired or needed for the bearer service is optional but may be very advantageous since it allows the service provider to control the QoS too a higher degree than provided by prior art solutions. The service provider may be interested in making sure that the terminal does not map a received SDP-file to QoS parameters that the service provider considers unsuitable for the bearer service since they result in poor QoS. Poor QoS may have a bad reflection on the service provider even if the poor QoS is a result of the implementation of the terminal. The supplemental check is here presented in combination with a token unaware terminal (i.e. a terminal that is not aware of an authorization token according to prior art), but the supplemental check may also be implemented in a system that makes use of an authorization token as binding mechanism instead of the terminal identity as described herein.

If it is of interest to perform the supplemental check the AF should be implemented with information that defines a set of minimum QoS parameters against which the requested QoS requirements may be checked. If the supplemental check results in a decision to upgrade the requested QoS parameters modified QoS parameters which correspond to an upgrade of the requested QoS parameters may be determined by the AF or the PDF. It is also necessary that the GGSN is implemented such that it is able to handle an upgrade of the requested QoS parameters. The upgrade scenario may require new signalling between the GGSN and other core network nodes and radio network nodes.

Figure 4:
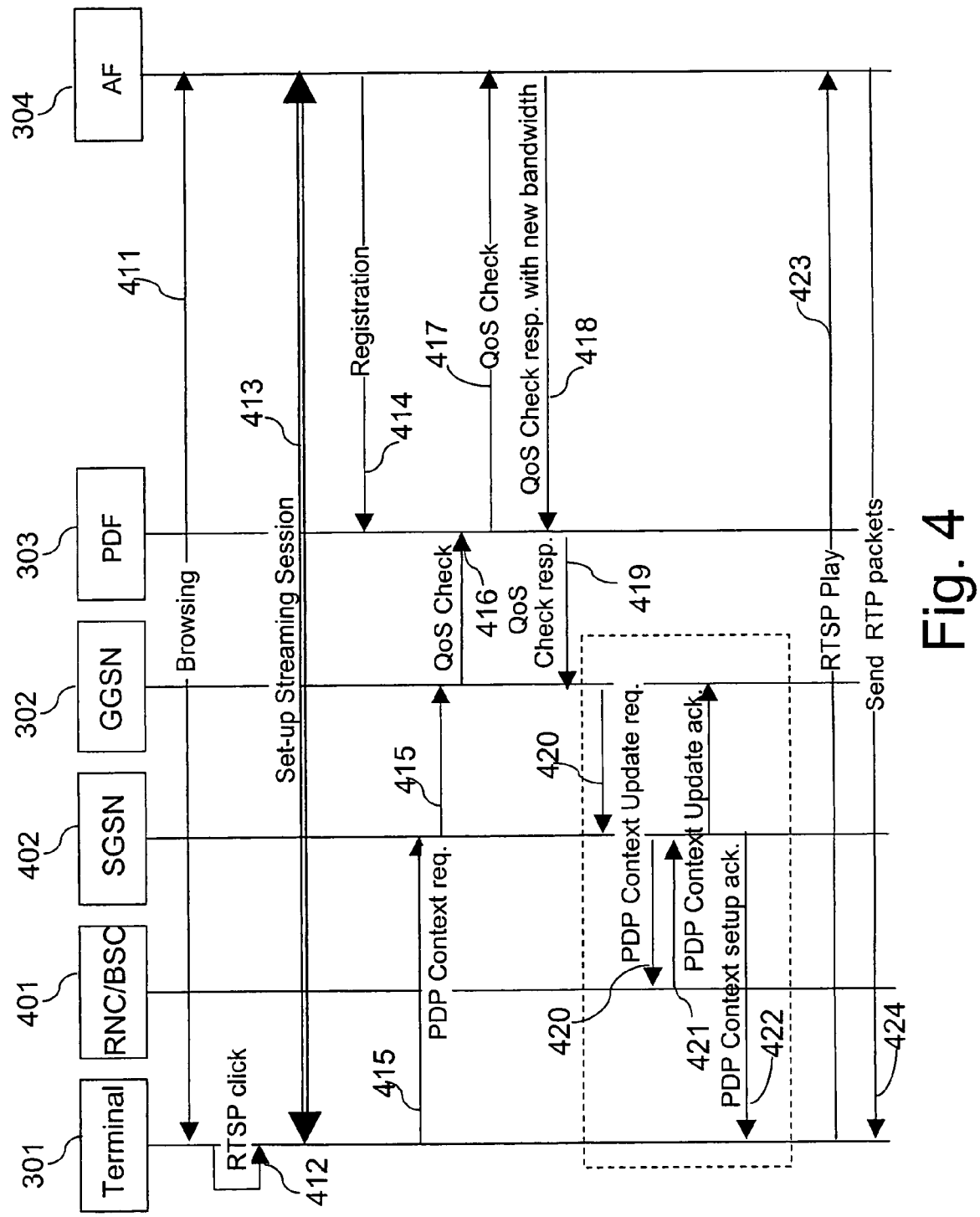
FIG. 4 is a schematic flow diagram illustrating an example alternative embodiment.

FIG. 4 is a schematic flow diagram that illustrates a scenario in which the requested QoS parameters are upgraded because the requested bandwidth was considered to low from the viewpoint of the service provider/AF. FIG. 4 illustrates, apart from the mobile terminal 301, the GGSN 302, the PDF 303 and the AF 304, also a radio network node 401, which e.g may be a Radio Network Controller (RNC) or a Base Station Controller (BSC), and a SGSN (Serving GPRS Support Node) 402. The session database 305 is not shown in FIG. 4, but the AF 304 may have an interface to the session database for retrieving specific session information. The dashed box 403 surrounds the new signalling scheme, compared with what is supported by the current 3GPP standard and which is needed in order to handle an upgrade of the requested QoS parameters. The steps 411-424 illustrated in FIG. 4 will now be described.

Step 411 The user has an interactive/browsing session established.

Step 412 The user clicks on an "rtsp-link".

Step 413 Streaming session establishment is performed.

Step 414 The AF (Application/Streaming server) registers the terminal identity in the PDF (this step corresponds to step 308 of FIG. 3).

Step 415 The terminal requests activation of a secondary PDP context (this step corresponds to step 311 of FIG. 3).

Step 416 The GGSN initiates a policy/QoS check with the PDF (this step corresponds to step 312 of FIG. 3).

Step 417 The PDF checks that the needed resource reservation that is defined by the requested QoS parameters, is within the subscribed limits and issues a check request towards the AF (this step corresponds to step 314 of FIG. 3).

Step 418 The AF sees that the bandwidth must be updated to ensure satisfactory end-user QoS during the service provisioning. Thus, it requests more bandwidth than the terminal initially requested (this step corresponds to step 316 of FIG. 3).

Step 419 The PDF replies back to the GGSN. The GGSN discovers that the bandwidth parameter has been changed to a higher value than what requested by the terminal. Thus, the GGSN needs to request an update of the secondary PDP context.

Step 420 The requests a modification (bandwidth upgrade) of the terminal's requested secondary PDP Context by sending a PDP Context update request message to the SGSN 402 which forwards the request to the radio network node 401.

Step 421 The radio network node 401 checks if it has enough resources to upgrade the bandwidth parameter. In this scenario it has enough resources and replies back to the SGSN (and the GGSN via the SGSN) with an acknowledgement. If the radio network node had not had enough resources, it is possible that the set-up of the service would be interrupted and that the requested service would be denied.

Step 422 The SGSN responds (possible in parallel with step 421) to the terminal's PDP context activation request with a different bandwidth parameter than the terminal initially requested.

Step 423 The terminal issues a "Play request".

Step 424 The application session starts.

The reason why a supplemental check as described above may be desired is that it is the terminal that translates or maps the application level QoS parameters to bearer service QoS parameters such as PDP context parameters. The implementation of the translation/mapping function in the terminal is vendor specific and may thus vary between different terminals. If the service provider is interested in delivering services with good quality irrespective of the terminal that requests the service the supplemental check may be desirable.

An example of application level QoS parameters are those defined for UMTS (Universal Mobile Telecommunication System). In UMTS QoS is defined with a set of attributes that specifies the UMTS bearer service. The UMTS QoS attributes are the following:

Traffic class
Maximum bit-rate
Guaranteed bit-rate
Delivery order
Maximum SDU size
SDU format information
SDU error ratio
Residual bit error ration
Delivery of erroneous SDUs
Transfer delay
Traffic handling priority
Allocation/Retention Priority
Source statistics descriptor Signaling Indication These attributes can be mapped to the pre-defined UMTS QoS classes: Conversational class, Streaming class, Interactive class and Background class. More detailed information about UMTS QoS can be found in the technical specifications 3GPP TS 23.107 V6.1.0 (2004-03) and 3GPP TS 23.207 V6.2.0 (2004-03).

The QoS classes can be negotiated and managed by using PDP context management. Application level QoS requirements are mapped to PDP context parameters in the mobile client terminal. In existing solutions, pre-configurations of PDP contexts are made in the client terminal such that when a packet switched application starts and connects to the network a matching pre-configured PDP context is activated. This PDP context has a selected QoS class that should match the desired QoS requirements of the application. If for instance the application is a WAP browser or MMS client the QoS class of the activated PDP context is usually the Interactive class.

Thus in the existing solutions, the selection of QoS parameters for the bearer service that is set up for delivery of the service in the example depends on the terminal vendor's configuration of the mobile client terminal. The service provider cannot influence the selection of the QoS parameters. As mentioned above this is in many instances problematic, especially from the viewpoint of the service provider, but also from a user perspective, when it results in set-up of a bearer service with a QoS that is not appropriate for the delivery of the service. The service provider is usually interested in being able to ensure that the offered service is delivered with a certain minimum quality. If the quality of service is bad this may have a negative impact on the service provider's reputation even if the bad quality is caused by a network operator or terminal vendor. The user of the service will become annoyed if the QoS is bad and will probably blame the service provider for the bad quality. It is also possible that a user with one terminal gets unacceptably bad QoS when receiving a particular service content while another user, with a terminal from another vendor, gets acceptable QoS when receiving the same service content.

However, as shown above, the example embodiment that includes a supplemental check, in which the service provider can control the requested QoS parameters and also modify them if is considered necessary, makes it possible to overcome many of the disadvantages that may arise when the terminal translates/maps application lever QoS requirements into bearer service QoS parameters.

In the drawings and specification, there have been disclosed embodiments and, although specific terms are employed, they are used in a generic and descriptive sense only and not for purposes of limitation, the scope of the invention being set forth in the following claims.

The invention claimed is:

1. A method comprising:
setting up a policy controlled bearer service for delivery of a service from an application function in a service network to a mobile radio terminal where the service is delivered to the mobile radio terminal over a radio interface by a radio network coupled to a core network which is coupled to the service network, wherein the setting up of the policy controlled bearer service, comprises:
registering a terminal identity of the mobile radio terminal associated with policy identifying information in a register of a policy decision function;
receiving a Packet Data Protocol (PDP) activation request from the terminal to establish a PDP context between the mobile radio terminal and the core network, via a core network node, wherein the PDP context activation request includes the mobile radio terminal identity and a set of requested quality of service (QoS) parameters for the PDP context;
binding the PDP context activation request to the policy identifying information by the mobile radio terminal identity to determine applicable policy information for the PDP context;
performing a policy check by checking if the requested QoS parameters fulfill said applicable policy information; and
sending a PDP context accept message to the core network node to initiate completion of the PDP context set-up if the policy check was successful,
wherein the set of requested quality of service (QoS) parameters for the PDP context includes QoS parameters for communication with the mobile radio terminal over the radio interface.

2. The method according to claim 1, wherein said terminal identity is a Mobile Identification Number (MSISDN), an International Mobile Subscriber Identity (IMSI), or an International Mobile Equipment Identity (IMEI), associated with the terminal.

3. The method according to claim 1, wherein said policy identifying information includes an address of the application function and wherein the step of binding the bearer service activation request to the policy identifying information includes requesting the applicable policy information from the application function identified by the application address in the policy identifying information.

4. The method according to claim 1, wherein said policy identifying information includes the applicable policy information for the bearer service to be set up.

5. The method according to any of claim 1, wherein said step of performing a policy check includes checking if the requested QoS parameters fulfill a set of predefined minimum QoS requirements provided by the application function.

6. The method according to claim 5, wherein the method includes a further step of determining a set of modified QoS parameters that match the set of predefined minimum QoS requirements if the requested QoS parameters do not fulfill the set of predefined minimum QoS requirements, and a further step of sending the set of modified QoS parameters to the core network node for use when setting up the bearer service.

7. The method according to claim 1, wherein the network node is a Gateway GPRS Support Node (GGSN).

8. The method according to claim 1, wherein the method includes a further step of removing the registration of the terminal identity and the policy identifying information from the register of the policy decision function after the step of performing the policy check.

9. A method in a policy decision function comprising:
performing policy control on a bearer service for delivery of a service from an application function in a service network to a mobile radio terminal, where the service is delivered to the mobile radio terminal over a radio interface by a radio network coupled to a core network which is coupled to the service network, wherein the performing policy control on a bearer service comprises:
receiving a registration message including a mobile radio terminal identity and policy identifying information;
registering the mobile radio terminal identity associated with the policy identifying information in a register;
receiving a Packet Data Protocol (PDP) activation request from the terminal to establish a PDP context between the mobile radio terminal and the core network, via a core network node, wherein the PDP context activation request includes the mobile radio terminal identity and a set of requested quality of service (QoS) parameters for the bearer service;

binding the PDP context activation request to the policy identifying information in the register by the mobile radio terminal identity to determine applicable policy information for the PDP context;

performing a policy check by checking if the requested QoS parameters fulfill said applicable policy information; and sending an accept message to the network node to initiate completion of the PDP context set-up if the policy check was successful, wherein the set of requested quality of service (QoS) parameters for the PDP context includes QoS parameters for communication with the mobile radio terminal over the radio interface.

10. The method according to claim 9, wherein said terminal identity is a Mobile Identification Number (MSISDN), an International Mobile Subscriber Identity (IMSI), or an International Mobile Equipment Identity (IMEI), associated with the terminal.

11. The method according to claim 9, wherein said policy identifying information includes an address of the application function and wherein the step of binding the bearer service activation request to the policy identifying information includes requesting the applicable policy information from the application function identified by the application address in the policy identifying information.

12. The method according to claim 9, wherein said policy identifying information includes the applicable policy information for the bearer service to be set up.

13. The method according to claim 9, wherein said step of performing a policy check includes checking if the requested QoS parameters fulfill a set of predefined minimum QoS requirements provided by the application function.

14. The method according to claim 13, wherein the method includes a further step of determining a set of modified QoS parameters that match the set of predefined minimum QoS requirements if the requested QoS parameters do not fulfill the set of predefined minimum QoS requirements, and a further step of sending the set of modified QoS parameters to the core network node for use when setting up the bearer service.

15. The method according to claim 9, wherein the core network node is a Gateway GPRS Support Node (GGSN).

16. The method according to claim 9, wherein the method includes a further step of removing the registration of the terminal identity and the policy identifying information from the register after the step of performing the policy check.

17. A policy decision function apparatus comprising:

a controller for performing policy control on a bearer service for delivery of a service from an application function in a service network to a mobile radio terminal where the service is delivered to the mobile radio terminal over a radio interface by a radio network coupled to a core network which is coupled to the service network, wherein the controller includes:

a first interface for receiving a registration message including a mobile radio terminal identity and policy identifying information;

a register for registering the mobile radio terminal identity associated with the policy identifying information;

a second interface for receiving a Packet Data Protocol (PDP) activation request from the mobile radio terminal to establish a PDP context between the mobile radio terminal and the core network, via a core network node, wherein the PDP context activation request includes the mobile radio terminal identity and a set of requested QoS parameters for the PDP context; and processing circuitry configured to:

bind the PDP context activation request to the policy identifying information in the policy decision function by the mobile radio terminal identity to determine applicable policy information for the PDP context;

perform a policy check by checking if the requested QoS parameters fulfill said applicable policy information; and send an accept message to the core network node to initiate completion of the PDP context set-up if the policy check was successful, wherein the set of requested quality of service (QoS) parameters for the PDP context includes QoS parameters for communication with the mobile radio terminal over the radio interface.

18. The apparatus according to claim 17, wherein said terminal identity is a Mobile Identification Number, MSISDN, an International Mobile Subscriber Identity, IMSI, or an International Mobile Equipment Identity, IMEI, associated with the terminal (301).

19. The apparatus according to claim 17, wherein said policy identifying information includes an address of the application function and wherein the processing circuitry is arranged to request the applicable policy information from the application function identified by the application address in the policy identifying information.

20. The apparatus according to claim 17, wherein said policy identifying information includes the applicable policy information for the bearer service to be set up.

21. The apparatus according to claim 17, the processing circuitry is further arranged to check if the requested QoS parameters fulfill a set of predefined minimum QoS requirements provided by the application function.

22. The according to claim 21, wherein the processing circuitry is further arranged to determine a set of modified QoS parameters that match the set of predefined minimum QoS requirements if the requested QoS parameters do not fulfill the set of predefined minimum QoS requirements, and to send the set of modified QoS parameters to the core network node for use when setting up the bearer service.

23. The apparatus according to claim 17, wherein the processing circuitry is arranged to remove the registration of the terminal identity and the policy identifying information from the register after the processing circuitry has completed the policy check.

* * * * *

UNITED STATES PATENT AND TRADEMARK OFFICE
CERTIFICATE OF CORRECTION

| | | |
|---|---|---|
| PATENT NO. | : 7,746,819 B2 | Page 1 of 1 |
| APPLICATION NO. | : 11/156488 | |
| DATED | : June 29, 2010 | |
| INVENTOR(S) | : Skog et al. | |

It is certified that error appears in the above-identified patent and that said Letters Patent is hereby corrected as shown below:

On the Title Page, item (57), under "ABSTRACT", in Column 2, Line 2, delete "(to" and insert -- to --, therefor.

In Column 3, Line 4, after "SUMMARY" delete "OF THE INVENTION".

In Column 5, Line 48, delete "sending a" and insert -- sending an --, therefor.

In Column 6, Line 9, delete "fulfil" and insert -- fulfill --, therefor.

In Column 10, Line 34, in Claim 5, delete "any of claim" and insert -- claim --, therefor.

In Column 12, Lines 29-30, in Claim 18, delete "Number, MSISDN," and insert -- Number (MSISDN), --, therefor.

In Column 12, Line 30, in Claim 18, delete "Identity, IMSI," and insert -- Identity (IMSI), --, therefor.

In Column 12, Line 31, in Claim 18, delete "Identity, IMEI," and insert -- Identity (IMEI), --, therefor.

In Column 12, Line 32, in Claim 18, delete "terminal (301)." and insert -- terminal. --, therefor.

In Column 12, Line 46, in Claim 22, delete "The according" and insert -- The apparatus according --, therefor.

Signed and Sealed this
Twenty-third Day of August, 2011

David J. Kappos
*Director of the United States Patent and Trademark Office*